US012696858B2

(12) United States Patent
Chappell

(10) Patent No.: US 12,696,858 B2
(45) Date of Patent: Aug. 4, 2026

(54) POT

(71) Applicant: Ryan Chappell, Horsham (GB)

(72) Inventor: Ryan Chappell, Horsham (GB)

( * ) Notice: Subject to any disclaimer, the term of this patent is extended or adjusted under 35 U.S.C. 154(b) by 160 days.

(21) Appl. No.: 18/557,523

(22) PCT Filed: Apr. 25, 2022

(86) PCT No.: PCT/GB2022/051041
§ 371 (c)(1),
(2) Date: Oct. 26, 2023

(87) PCT Pub. No.: WO2022/229614
PCT Pub. Date: Nov. 3, 2022

(65) Prior Publication Data
US 2024/0215503 A1 Jul. 4, 2024

(30) Foreign Application Priority Data

Apr. 26, 2021 (GB) ..................................... 2105935

(51) Int. Cl.
*A01G 27/00* (2006.01)
*A01G 31/02* (2006.01)
(52) U.S. Cl.
CPC ......... *A01G 27/005* (2013.01); *A01G 27/008* (2013.01); *A01G 31/065* (2025.01)
(58) Field of Classification Search
CPC .... A01G 27/00; A01G 27/005; A01G 27/006; A01G 27/008; A01G 31/02; A01G 31/065
See application file for complete search history.

(56) References Cited

U.S. PATENT DOCUMENTS

| | | | | |
|---|---|---|---|---|
| 1,096,883 A | * | 5/1914 | Alger ...................... | G01D 1/04 |
| | | | | 73/861.46 |
| 4,138,803 A | * | 2/1979 | Sherlock ................ | A01G 9/024 |
| | | | | 47/81 |
| 4,308,690 A | * | 1/1982 | Klein ..................... | A01G 27/00 |
| | | | | 47/79 |
| 4,846,608 A | * | 7/1989 | Sanders ................. | B65G 53/14 |
| | | | | 406/173 |
| 5,826,374 A | * | 10/1998 | Baca ...................... | A01G 31/02 |
| | | | | 47/60 |

(Continued)

FOREIGN PATENT DOCUMENTS

AU          5051790 A  *  8/1991  ............. A01G 9/023

OTHER PUBLICATIONS

International Search Report and Written Opinion, PCT/GB2022/05104, dated Sep. 5, 2022, 12 pages.

*Primary Examiner* — Ebony E Evans
(74) *Attorney, Agent, or Firm* — Nelson Mullins Riley & Scarborough LLP; Anthony A. Laurentano

(57) ABSTRACT

A pot (1) for use in growing plants comprises a base (2), an annular wall (3) extending from the base (2) to a rim (4), a drain (5) being defined substantially in the centre of the base (2), an injector (6) in the wall (3) for injecting fluid into the pot (1), wherein the injector (6) is located in the wall (3) proximate to the base (2) and distant to the rim (4) and aligned with a plane tangential to the wall (3), the injector (6) comprising a venturi and an air inlet. The pot (1) forms part of a recirculating deep water culture (RDWC) hydroponic system.

33 Claims, 4 Drawing Sheets

(56)         References Cited

U.S. PATENT DOCUMENTS

| | | | | |
|---|---|---|---|---|
| 5,918,415 | A * | 7/1999 | Locke | A01G 27/00 |
| | | | | 47/79 |
| 6,345,470 | B1 * | 2/2002 | Slaght | A01G 27/02 |
| | | | | 47/79 |
| 9,439,370 | B2 * | 9/2016 | Donnelly | A01G 27/06 |
| 2011/0059518 | A1 * | 3/2011 | Bribach | A01G 9/025 |
| | | | | 435/266 |
| 2012/0005957 | A1 | 1/2012 | Downs, Sr. | |
| 2013/0255152 | A1 * | 10/2013 | Johnson | A01G 31/02 |
| | | | | 47/62 C |
| 2015/0000190 | A1 * | 1/2015 | Gibbons | A01G 31/02 |
| | | | | 47/79 |
| 2018/0368346 | A1 * | 12/2018 | Watson | A01G 31/06 |
| 2019/0223395 | A1 | 7/2019 | Warrick | |
| 2021/0185952 | A1 * | 6/2021 | Campau | A01G 27/006 |
| 2022/0330493 | A1 * | 10/2022 | Kashinsky | A61L 9/22 |

* cited by examiner

POT

CROSS-REFERENCE TO RELATED APPLICATIONS

This Application is a § 371 National Stage of Application No. PCT/GB2022/051041 claims priority from Application 2105935.7 filed on Apr. 26, 2021, in the United Kingdom. The entire contents of these applications are incorporated herein by reference in their entirety.

The present invention relates to a pot suitable for use in growing plants. In particular, the invention relates to pot for use in recirculating deep water culture (RDWC) hydroponic systems.

BACKGROUND OF THE INVENTION

Recirculating Deep Water Culture (RDWC) is a method used to grow plants with roots submerged in a highly oxygenated nutrient solution.

By using RDWC hydroponic systems it is possible to optimise maximum plant growth potential. An oxygenated nutrient solution is constantly recirculated around the system. A water pump creates a current which draws the solution through the pots, mixing nutrients in the solution. This current also delivers vital nutrients to roots, optimising root health and in-creasing nutrient uptake efficiency. Importantly, pH and electrical conductivity (EC) levels are continuously maintained due to a high volume of water contained in the system.

Typical RDWC systems use negative pressure to draw nutrient solution through a number of plant sites. When plant food is added to the system via the "header" the first pot receives a concentrated dose of nutrients which is not ideal as this can shock the plant. Once the nutrient solution recirculates around the system the nutrient concentration stabilises. This can be avoided by very carefully drip feeding the nutrients into the system but this is often not practical.

In light of the problems discussed above, various proposals have been made, but there remains a need for an improved surface which address one or more of the problems presented by prior art arrangements. In this regard, the present invention seeks to provide an alternative surface which preferably addresses one or more of the problems presented by prior art arrangements.

The system of the invention is an RDWC system, but unlike known systems it employs positive pressure to recirculate nutrient solution rather than negative pressure. One advantage of this is that when the nutrients are added to the "header" the nutrient solution is dispersed to all plant sites simultaneously and equally. This avoids any one of the sites receiving a more concentrated dose than the others.

SUMMARY OF THE INVENTION

In accordance with a first aspect of the present invention there is provided a pot for use in growing plants which comprises a base, an annular wall extending from the base to a rim, a drain being defined in the base, an injector in the wall for injecting fluid into the pot, wherein the injector is located in the wall proximate to the base and distant to the rim and aligned with a plane tangential to the wall, the injector comprising a venturi and an air inlet.

Advantageously, fluid injected into pot through the injector is caused to rotate in the pot under pressure of the fluid to provide a whirlpool effect. In addition, oxygen content in the fluid is increased by drawing air into the fluid through the venturi.

In one embodiment, the injector meets the wall of the pot to inject fluid into the pot in a clockwise direction. In an alternative embodiment, the injector meets the wall of the pot to inject fluid into the pot in an anticlockwise direction.

Preferably, the air inlet comprises an air line and an air filter. The air filter provides the advantage of preventing debris from entering the airline which might block the air inlet and/or the venturi.

Preferably, the air inlet comprises an air intake silencer. Preferably, the air intake silencer is located in the air line between the venturi and the air filter. The air intake silencer provides the advantage of reducing pitch and/or volume of sound caused by air being concentrated into the fluid by the venturi.

Preferably, the venturi comprises a 19.05 mm (¾ inch) inlet and outlet. Advantageously, a venturi of this size has been found to achieve high oxygen saturation of the fluid. Preferably, the fluid is water or an aqueous suspension or solution of plant nutrients.

Preferably, the pot has a capacity of about 55 L to about 60 L. More preferably, the pot has a capacity of about 58 L. Advantageously, this capacity has been found to achieve high oxygen saturation of the fluid. In addition, it has been found to achieve an excellent whirlpool effect. This results in a desirable circular flow of fluid, which guides and collects plant roots in the centre of the pot thereby helping prevent blockages.

Without wishing to be bound by theory, it has been found that a whirlpool effect provided by a moving flow of water is capable of raising oxygen content of the circulating fluid compared to the oxygenation achieved by air stones which create bubbles in the centre of the pot only. In comparison to the invention, it has been found that when air stones are used, fluid around the air stones is oxygenated, but the fluid doesn't flow and oxygen content of the fluid elsewhere is less than in the centre.

Preferably, at least one clip mounting slot is provided on the rim of the pot. Preferably, the clip mounting slot provides a mounting location for an air filter clip, whist allowing flush fitment of the lid on the rim.

Preferably an indicator of fluid level is provided on the inner facing surface and/or outer facing surface of the wall. Preferably, the indicator comprises a line indicating a level of fluid in the pot. Advantageously, the indicator provides visual indication for a required fluid level when the pot is in use.

Preferably, the inner face of the base is inclined from the wall to the drain. In this regard, preferably, when the join between the wall and the base is positioned in a horizontal plane, the inner face of the base is inclined downwardly from horizontal to the drain at an angle of about 5° to about 10°. More preferably, the inner face of the base is inclined downwardly from horizontal to the drain at an angle of about 7°. This provides the advantage that the pot is capable of being fully drained by gravity.

Preferably, the drain of the pot is provided with a 12.7 cm (5 inch) coupling. This coupling has been found to result in excellent drainage of the pot when required.

Preferably, an injector mounting point is provided in the wall proximate to the base and distal to the rim. In this regard, it is closer to the base than the rim. Preferably, the mounting point is adjacent the base.

Preferably, the injector mounting point is formed in the wall of the pot. Preferably, the injector comprises a conduit which extends through the mounting point parallel with a plane tangential to the wall of the pot.

Preferably, the conduit defines an opening through which fluid is injected into the pot, wherein the opening is located a tangential distance of about 250 mm to about 300 mm from the inner wall of the pot. More preferably, the opening is located a tangential distance of about 290 mm from the inner wall of the pot. Advantageously, by positioning the opening close to the side wall slows water significantly and reduces the whirl pool effect.

Preferably, in use, fluid is injected into the pot through the injector conduit and the opening so that the maximum flow is achieved at a distance of about 50 mm to about 80 mm normal to the inner wall of the pot. More preferably, in use, fluid is injected into the pot through the injector conduit and the opening so that the maximum flow is achieved at a distance of about 65 mm normal to the inner wall of the pot. Advantageously, it has been found that an injector conduit which projects to this distance from the internal face of the wall significantly slows the flow of fluid in the pot and reduces to whirl pool effect so that it provides maximum benefit.

Preferably, the injector conduit has a shallow upward tilt. In this regard, preferably, when the join between the wall and the base is positioned in a horizontal plane, the injector conduit is inclined upwardly at an angle of about 5° to about 10° from horizontal. More preferably, the injector conduit is inclined upwardly at an angle of about 7° from horizontal. This provides the advantage that the injector conduit guides fluid and bubbles injected through the injector upwards in a gentle spiral to help distribute oxygen concentration evenly throughout the entire fluid in the pot. It has been found that a steeper angle results in the bubbles reaching the surface too quickly and less effective oxygen concentration.

Preferably, the wall of the pot is tapered towards the base. In this regard, preferably when the join between the wall and the base is positioned in a horizontal plane, the wall is tapered at an angle of about 5° to about 10° from vertical. More preferably, the wall is tapered at an angle of about 7° from vertical. This provides the advantage that it allows pots to be stacked effectively for easier storage and distribution.

Preferably, the drain is defined by an aperture in the base substantially in the centre of the base. It has been found that locating the drain substantially in the centre of the base assists in promoting a whirl pool effect as fluid naturally forms a whirl pool when draining as explained by application of Bernoulli's principle. In this regard, experimental testing with a side mounted drain revealed a proper whirl pool cannot form if the drain point is not substantially in the centre of the base.

Preferably, a removable lid is provided, which corresponds with the rim of the pot. The lid provides the advantage of insulating the pot, preventing debris from entering the pot and blocking light from entering the pot. In particular it prevents light from reaching any plant roots in the pot, which would be detrimental to plant health.

Preferably, the lid defines an opening which is preferably circular. The provides the advantage of enabling a plant to grow through the lid and the lit supports the plant Preferably a propeller pattern is provided on the surface of the lid. Preferably the propeller pattern is raised from the lid. This provides the advantage of providing strength to the lid to assist in supporting the weight of a plant.

Preferably, the lid comprises a removable access hatch. This provides the advantage of an access point to test electrical conductivity and acidity of fluid in the pot or to visually check the health of plant roots in the pot.

Preferably, a recess in the removable access hatch is provided. The recess provides the advantage of easy finger access to facilitate removal.

Preferably, the lid defines a cut out. The cut out provides the advantage of mounting a net pot inside the pot.

Preferably, the lid provides easy finger access to lift a net pot out of the pot when filled with fluid and/or a plant.

Preferably, the net pot comprises a square basket which is capable of receiving a standard rockwool cube.

Preferably, the net pot comprises a base having a raised grid. The raised grid provides the advantage of lifting a rockwool cube in the basket out of any fluid in the pot and thereby prevents it remaining in direct contact with the fluid, which would be expected to oversaturate the rockwool cube.

Preferably, the net pot has a circular rim which corresponds with a circular cut out defined in the lid of the pot. The provides the advantage of enabling the net pot to be rotated relative to the lid of the pot.

Preferably, the rim of the net pot overhangs one or more finger points defined in the lid for easy removal/transfer of the net pot.

In a second embodiment, the invention provides a kit for recirculating deep water culture (RDWC) of plants wherein the kit includes a pot according to the invention.

Preferably, the kit includes a stand for a plurality of pots according to the invention.

Preferably, the stand provides secure mounting for the base of each pot so an assembly of the stand and each pot sits correctly on a flat surface, for example the floor.

Preferably, the mounting for the base of each pot includes a location projection or indent which corresponds with a location indent or projection on each pot. This provides the advantage of preventing each pot from rotating relative to the stand.

Preferably, the stand allows a 12.7 cm (5 inch) coupler connected to the drain of each pot to rest on a surface under the stand. For example, when the stand is placed on a flat floor surface, the 12.7 cm (5 inch) coupler rests on the floor.

Preferably, the stand is arranged to allow the maximum amount of fluid to be drained from each pot when each pot is emptied. In this regard, preferably, the stand is arranged at an angle of about 1° to about 10° to facilitate drainage.

Preferably, the stand defines a cut out for a conduit to the injector. This provides the advantage of allowing the conduit to be positioned under the pot thereby keeping the conduit away from walkways and reducing the overall footprint of the assembled kit. Preferably the conduit comprises a rigid pipe. Preferably the pipe has an inner diameter of about 18 mm. Preferably, the pipe has an outer diameter of about 22 mm.

Preferably, the kit comprises a dual flow tee/elbow having a first channel for connection to the drain of each pot. Preferably the dual flow tee/elbow has an internal diameter of about 12.7 cm (5 inches). It has been found that this large size helps to mitigate risk of blockage (and therefore water overflow) in the event plant roots grow down through the drain of a pot and into pipework. This works in conjunction with the whirlpool flow caused by the injector—which gathers plant roots helping to keep them contained. In contrast with the invention, flooding is common problem with positive pressure systems which do not employ a whirlpool and/or use smaller diameter fittings in their pipework.

Preferably, the dual flow tee/elbow has a thread for threading onto a corresponding thread on the drain of the pot. Preferably, one or more second channels are defined on the side of the thread. This provides the advantage of a secondary channel for flow of fluid if the first channel becomes blocked. This further helps to mitigate the risk of flooding. In addition, the second channel(s) help to maximise the amount of water that can be drained from a port when fluid is drained from the pot. This helps to prevent dilution of fresh nutrient solution with stale solution left in pots which is a common problem with known systems.

Preferably, the kit comprises a header pot. Fluid is placed into the header pot and distributed from the header pot to each pot via an injector.

Preferably, the header pot is mounted on a custom elbow incorporating mounting features which double up as a stand. This provides the advantage of reducing the number of components required for the kit.

Preferably, the kit comprises a pump. In use, the pump pressurises fluid from the header pot and pumps it through the injectors into the pots. The fluid drains from each pot through each drain and the 12.7 cm (5 inch) couplers back to the header pot.

Preferably, the pump is a centrifugal type pump with a built-in filter to remove any debris such as plant matter and organic build-up. These pumps are used typically in swimming pool applications and preferably range from about 180 w to about 2200 w.

Preferably the pump is located externally to the header pot. This provides the advantage of keeping fluid temperature as low as possible. In contrast, pumps mounted internally to a header pot would dissipate waste heat energy into the fluid raising fluid temperature, which is undesirable for optimal plant growing conditions.

Preferably, in use, the pump draws fluid from the header pot, pumping it to the injectors under pressure. Fluid recirculates to the header pot via the 12.7 cm (5 inch) dual flow couplings and pipework.

Preferably, the kit comprises pipework. The pipework is located between the header pot and the pump and between the pump and the injectors.

Preferably, the pipework comprises rigid pipework. Preferably it has an internal diameter of about 18 mm. Preferably, it has an external diameter of about 22 mm. This size has been found to work well in accordance with the invention.

Preferably, the pipework comprises push fit connections. This provides the advantage of facilitating assembly of the kit.

BRIEF DESCRIPTION OF THE DRAWINGS

The invention will now be further described with reference to the accompanying drawings in which.

DETAILED DESCRIPTION OF THE INVENTION

It will be appreciated that aspects, embodiments and preferred features of the invention have been described herein in a way that allows the specification to be written in a clear and concise way. However, unless circumstances clearly dictate otherwise, aspects, embodiments and preferred features can be variously combined or separated in accordance with the invention. Thus, preferably, the invention provides a device having features of a combination of two or more, three or more, or four or more of the aspects described herein. In a preferred embodiment, a device in accordance with the invention comprises all aspects of the invention.

Within the context of this specification, the word "about" means plus or minus 20%, more preferably plus or minus 10%, even more preferably plus or minus 5%, most preferably plus or minus 2%.

Within the context of this specification, the word "substantially" means preferably at least 90%, more preferably 95%, even more preferably 98%, most preferably 99%.

Within the context of this specification, the word "comprises" means "includes, among other things" and should not be construed to mean "consists of only".

Within the context of this specification, an "air stone", also called an aquarium bubbler, is a piece of aquarium furniture, traditionally a piece of limewood or porous stone, whose purpose is to gradually diffuse air into a tank, eliminating the noise and large bubbles of conventional air filtration systems, and providing other benefits to the health of the fish. "Air stone" is also a brand name stone or brick veneer used by homebuilders. Air stones are sold in a very wide variety of shapes, sizes, and levels of coarseness—from extremely rough, producing larger (though still typically unnoticeable) bubbles and letting in more oxygen—to very fine, producing minuscule bubbles.

The invention provides a pot for use in recirculating deep water culture (RDWC) of plants wherein roots of the plant are submerged in a highly oxygenated nutrient solution.

Figure 1:
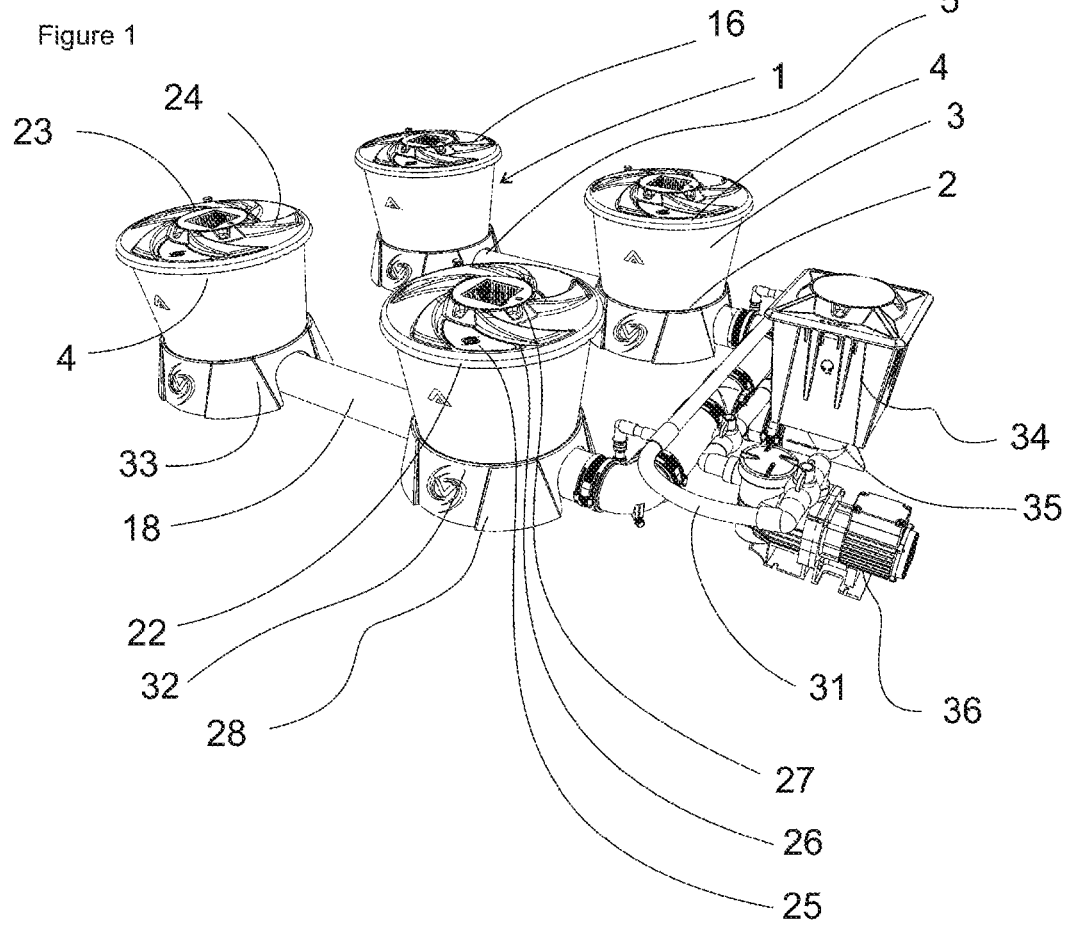
FIG. 1 shows a perspective view of an embodiment of the invention.
Figure 2:
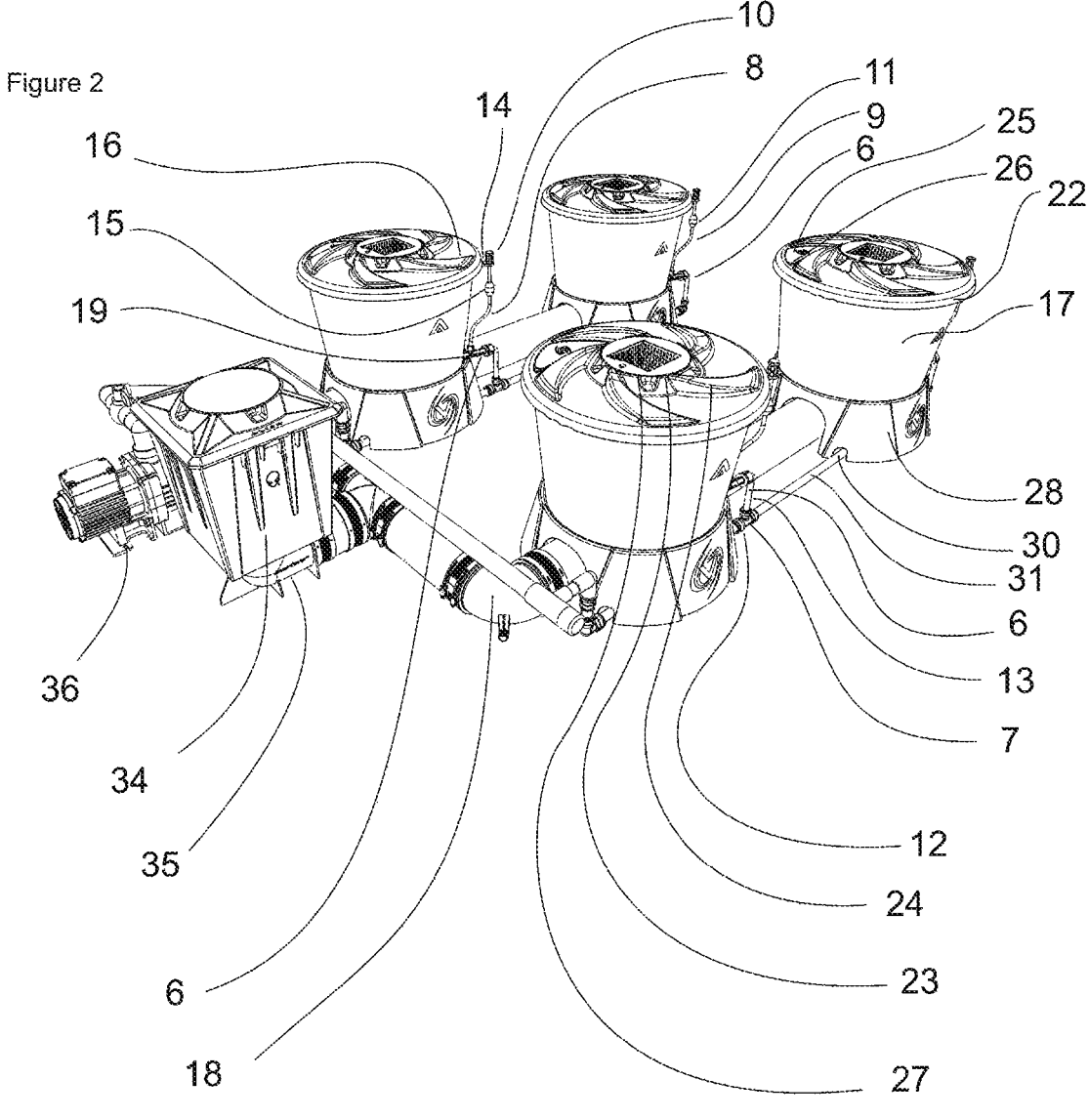
FIG. 2 shows an alternative perspective view of an embodiment of the invention.

As shown in FIGS. 1 and 2, an embodiment of the invention comprises a pot (1) having a capacity of 58 L for use in growing plants which comprises a base (2), an annular wall (3) extending from the base (2) to a rim (4), a drain (5) being defined in the base (2), an injector (6) in the wall (3) for injecting fluid into the pot (1), wherein the injector (6) is located in the wall (3) proximate to the base (2) and distant to the rim (4) and aligned with a plane tangential to the wall (3), the injector (6) comprising a venture (7) and an air inlet (8). The fluid is water or an aqueous suspension or solution of plant nutrients.

In the embodiment shown, the injector (6) meets the wall (3) of the pot (1) to inject fluid into the pot (1) in a clockwise direction. In an alternative embodiment, the injector (6) meets the wall of the pot (1) to inject fluid into the pot in an anticlockwise direction.

The air inlet (8) comprises an airline (9) and an air filter (10).

The air inlet (8) also comprises an air intake silencer (11) in the air line (9) between the venture (7) and the air filter (10).

The venture (7) comprises a 19.05 mm (¾ inch) inlet (12) and outlet (13).

A clip mounting slot (14) is provided on the rim (4) of the pot (1). The clip mounting slot (14) provides a mounting location for an air filter clip (15), whist allowing flush fitment of the lid (16) on the rim (4).

An indicator (17) of fluid level is provided on the inner facing surface of the wall (3). The indicator (17) comprises a line indicating a level of fluid in the pot (1).

The inner face of the base (2) is inclined from the wall (3) to the drain (5). In this regard, preferably, when the annular join between the wall (3) and the base (2) is positioned in a horizontal plane, the inner face of the base (2) is inclined downwardly from horizontal to the drain at an angle of about 7°.

The drain (5) of the pot (1) is provided with a 12.7 cm (5 inch) coupling (18).

An injector mounting point (19) is provided in the wall (3) proximate to the base (2) and distal to the rim (4) of the pot (1). In this regard, the mounting point (19) is adjacent the base (2).

The injector mounting point (19) is formed in the wall (3) of the pot (1).

Figure 3:
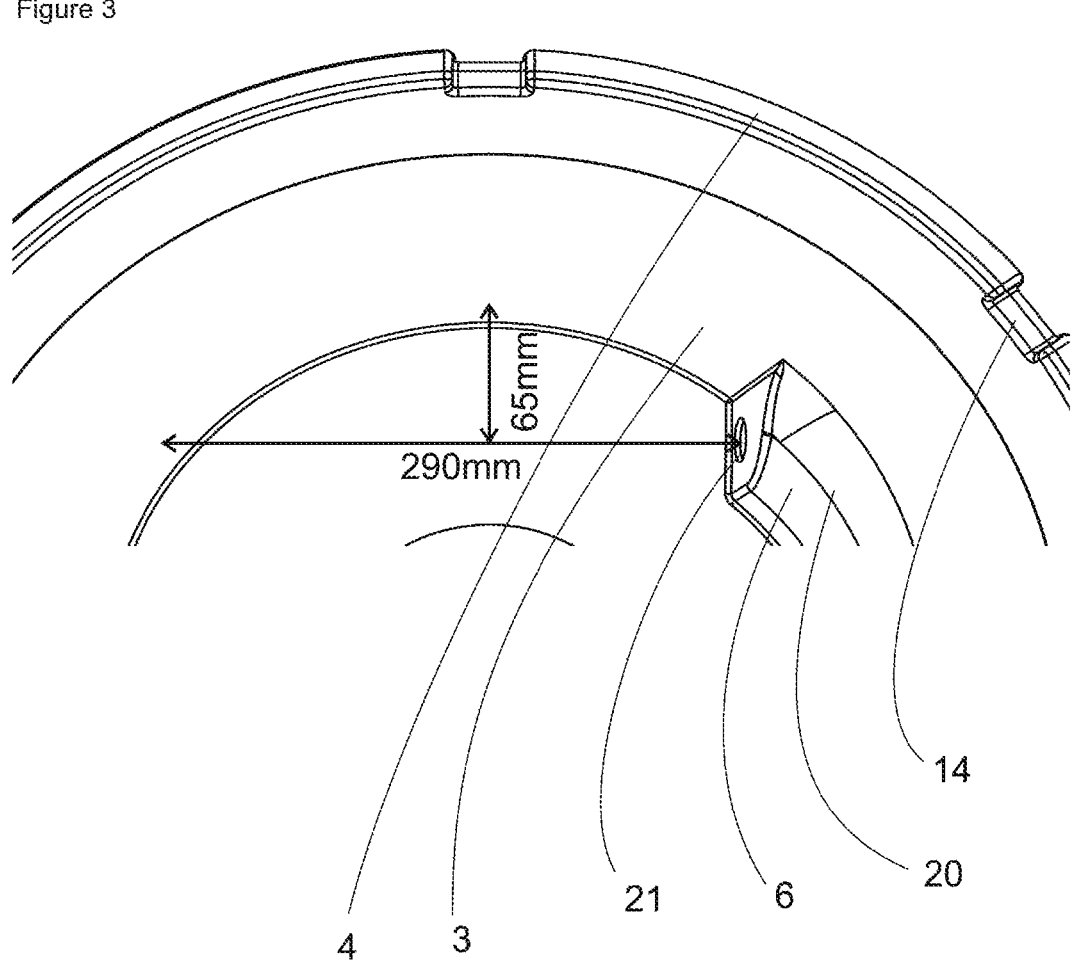
FIG. 3 shows an injector in the wall of pot of the invention for injecting fluid into the pot.

As shown in FIG. 3, an injector conduit (2) defines an opening (21) through which fluid is injected into the pot (1), wherein the opening (21) is located a tangential distance of about 290 mm from the inner wall (3) of the pot (1).

In use, fluid is injected into the pot (1) through the injector conduit (20) and the opening (21) so that the maximum flow is achieved at a distance of about 65 mm normal to the inner surface of the wall (3) of the pot (1).

The injector conduit (20) has a shallow upward tilt. In this regard, when the join between the wall (3) and the base (2) is positioned in a horizontal plane, the injector conduit is inclined upwardly at an angle of about 7° from horizontal.

The wall (3) of the pot (1) is tapered towards the base (2). In this regard, when the annular join between the wall (3) and the base (2) is positioned in a horizontal plane, the wall (3) is tapered at an angle of about 7° from vertical.

The drain (5) is defined by an aperture in the base (2) substantially in the centre of the base (2).

A removable lid (16) is provided having a rim (22) which corresponds with the rim (4) of the pot (1).

The lid (16) defines an opening (23) which is preferably circular. This provides the advantage of enabling a plant to grow through the lid (16) and the lid (16) supports the plant.

A propeller pattern (24) is provided on the surface of the lid (16). The propeller pattern (24) is raised from the lid.

The lid (16) comprises a removable access hatch (25).

A recess (26) in the removable access hatch (25) is provided for easy finger access to facilitate removal.

The lid (16) defines a cut out (27) for mounting a net pot inside the pot.

The lid (16) provides easy finger access to lift a net pot out of the pot (1) when filled with fluid and/or a plant.

The net pot comprises a square basket which is capable of receiving a standard rockwool cube. In addition, it comprises a base having a raised grid. Furthermore, the net pot has a circular rim which corresponds with a circular cut out defined in the lid of the pot.

The rim of the net pot overhangs one or more finger points defined in the lid (16) for easy removal/transfer of the net pot.

The pot (1) forms part of a kit which includes a stand (28) for a plurality of pots (1) according to the invention.

The stand (28) provides secure mounting for the base (2) of each pot (1) so an assembly of the stand (28) and each pot (1) sits correctly on a flat surface, for example the floor.

The mounting for the base (2) of each pot (1) includes a location projection (29) or indent which corresponds with a location indent or projection on each pot. The corresponding location projection and indent prevents each pot from rotating relative to the stand.

The stand (28) allows a 12.7 cm (5 inch) coupler (18) connected to the drain (5) of each pot (1) to rest on a surface under the stand (28). In this regard, when the stand (28) is placed on a flat floor surface, the 12.7 cm (5 inch) coupler (18) rests on the floor.

The stand (28) is arranged to allow the maximum amount of fluid to be drained from each pot (1) when each pot (1) is emptied. In this regard, the stand (28) is arranged at an angle of about 1° to about 10° to facilitate drainage.

The stand (28) defines a cut out (30) for pipework (31) to the injector (6). This allows the pipework (31) to be positioned under the pot (1) thereby keeping the pipework (31) away from walkways and reducing the overall footprint of the assembled kit. The pipework (31) has an inner diameter of 18 mm. The pipework (31) has an external diameter of 22 mm.

The kit comprises a dual flow tee (32)/elbow (33) having a first channel for connection to the drain (5) of each pot. The dual flow tee (32)/elbow (33) has an internal diameter of about 12.7 cm (5 inches). The dual flow tee (32)/elbow (33) has a thread for threading onto a corresponding thread on the drain (5) of the pot (1). One or more second channels are defined on the side of the thread.

The kit comprises a header pot (34). Fluid is placed into the header pot (34) and distributed from the header pot (34) to each pot (1) via an injector (6).

The header pot (34) is mounted on a custom elbow (35) incorporating mounting features which double up as a stand. This reduces the number of components required for the kit.

The kit comprises a pump (36) located externally to the header pot (34). In use, the pump (36) pressurises fluid from the header pot (34) and pumps it through the injectors (6) into the pots (1). The fluid drains from each pot (1) through each drain (6) and the 12.7 cm (5 inch) couplers (18) back to the header pot (34).

The pump (36) is a centrifugal type pump with a built-in filter to remove any debris such as plant matter and organic build-up. The pump (36) has a power in the range of from about 180 w to about 2200 w.

The kit comprises rigid pipework (31) located between the header pot (34) and the pump (36) and between the pump (36) and the injectors (6). It has an internal diameter of about 18 mm and an external diameter of 22 mm.

The pipework (31) comprises push fit connections, which facilitate assembly of the kit.

The invention provides the advantages of:
Aeration of fluid is achieved without the need for separate air pumps. Air pumps create heat, noise and vibrations. This invention eliminates these issues.

Fluid injection at pressure through venturis (7) creates a whirlpool in each pot which has several key advantages. It increases oxygen saturation in water (higher and more even saturation than when using more standard techniques such as air stones). A whirlpool effect helps to gather and contain roots which is more space efficient and helps prevent risk of blockages.

The invention is designed to minimise risk of blockages/flooding. In this regard, large 12.7 cm (5 inch) pipes and fittings are the largest in the industry and provide a very low risk of blockage compared to other systems. 12.7 cm (5 inch) stainless steel hose clamps are used to secure the pipe & fittings.

Dual flow fittings provide additional drain paths.

The invention has been found to minimise fluid temperature and keep it as low as possible, which helps improve oxygen saturation and plant health.

The main pump (36) is located external to the header pot (34) to prevent heating of fluid.

Thick walled pipework (31) is used to insulate the pipes and keep fluid temperature low.

A silver coloured finish is provided for the pots (1), lids (16) and/or main pipework (31). This reflects radiated heat.

The invention blocks light reaching plant roots for better plant health.

The pots (1)/lids (16) of the invention are produced from thick 3 mm wall plastic to prevent light transmission.

There are lids (16)/covers provided in all access points to block light from reaching plant roots.

EXAMPLES

Example 1

Oxygen Content Experiment

The experiment was carried out to determine the oxygen content of aerated tap water in a in a hydroponic system pot using two different methods.

The methods tested—Traditional Air stone vs the Vortex effect provided by embodiments of the present invention.

Typically the air stone or Vortex method would yield the same oxygen content although in the Vortex application the water enters the pot from a side mounted location which creates a Vortex effect.

The experiment was carried out at 160 feet above sea level.

The containers used were identical 58 L pots with 35 L of water in each.

Water pump spec:
Centrifugal type
180 w
10,800 LPH

All readings were taken with the water temperature at 18° C. This temperature is considered to be the ideal for plant roots submerged in water. A water chiller was installed to ensure a consistent 18° C.

The instrument used to measure the dissolved oxygen content readings:

Extech DO210: Compact Dissolved Oxygen Meter
Measures Dissolved Oxygen, % Oxygen and Temperature in Water The DO210 is a Dissolved Oxygen Meter which measures DO from 0 to 20.0 mg/L, Oxygen percent saturation from 0 to 100.0% and temperature with ATC. This meter features Adjustable Altitude and Salinity Compensation as well as min, max and data hold functions.

The experiment was carried out multiple times over the course of 8 weeks to see if there were any detrimental effects over this time to the consistency of oxygen content.

The readings were the same every time over this period providing the water temperature remained at 18° C.

The readings were taken from 10.0 cm (4 inches) below the surface as recommended by the instrument manufacturers. The locations of the readings in the pots were taken from 12, 3, 6 and 9 o'clock positions and also a central position.

Air Stone Readings

The air stone provided readings of 9.4 PPM in the centre of the pot which is the highest reading possible at this water temperature. At the 12, 3, 6 and 9 o'clock positions adjacent the wall of the pot, the readings were 8.7 PPM. The reason for the drop in dissolved oxygen content from the centre to the side of the pot is the fact that the bubbles created by the air stone break only in the central area of the pot. This creates a paddle effect and churns the water scooping air from the atmosphere, integrating it into the water. The water not effected by the central activity is not as agitated and has no real direction of flow. This results in the oxygen content reading being lower here than at the centre of the pot.

Vortex Readings

The vortex produced by embodiments of the invention, provided readings of 9.4 PPM in the centre of the pot. At the 12, 3, 6 and 9 o'clock positions adjacent the wall of the pot, the readings were also 9.4 PPM. It was concluded that the consistent readings were due to the fact that the water is in motion/flowing throughout the entire pot.

Vortex

The vortex alone can sustain 98% of concentration without the Venturi vacuuming atmosphere into the water. As part of the experiment the air inlets of the venturis were blocked off to test this with a vortex only.

Benefits of using Venturis to vacuum air into the pot:
1. Bubbles breaking on the surface adds extra 2% oxygen concentration.
2. Optional—Air inlets of Venturis can be linked together and plumbed into an oxygen generator. The pure oxygen can then be introduced into the water via the Venturis. This raises the oxygen content in the fluid to several times that provided by mere atmospheric contact. Readings of 30 PPM were recorded. Plants can benefit from a high PPM of oxygen concentration at around 12 PPM. A higher concentration of 30 PPM could be detrimental to plant health if maintained for a prolonged period of time although if only applied for a short period time this application can be used to eliminate bacteria and disease.

The maximum flow rate tested through the Venturi is 7.5 litres per minute. The maximum water pressure is 6.75 psi measured at the point of flow before the Venturi. The water pump was connected to a voltage controller so the pressure could be lowered to test the minimum amount of water flow and pressure required to maintain the oxygen content and Vortex effect. The minimum flow rate was found to be 5.8 LPM and the minimum pressure was found to be 4 psi.

Figure 4:
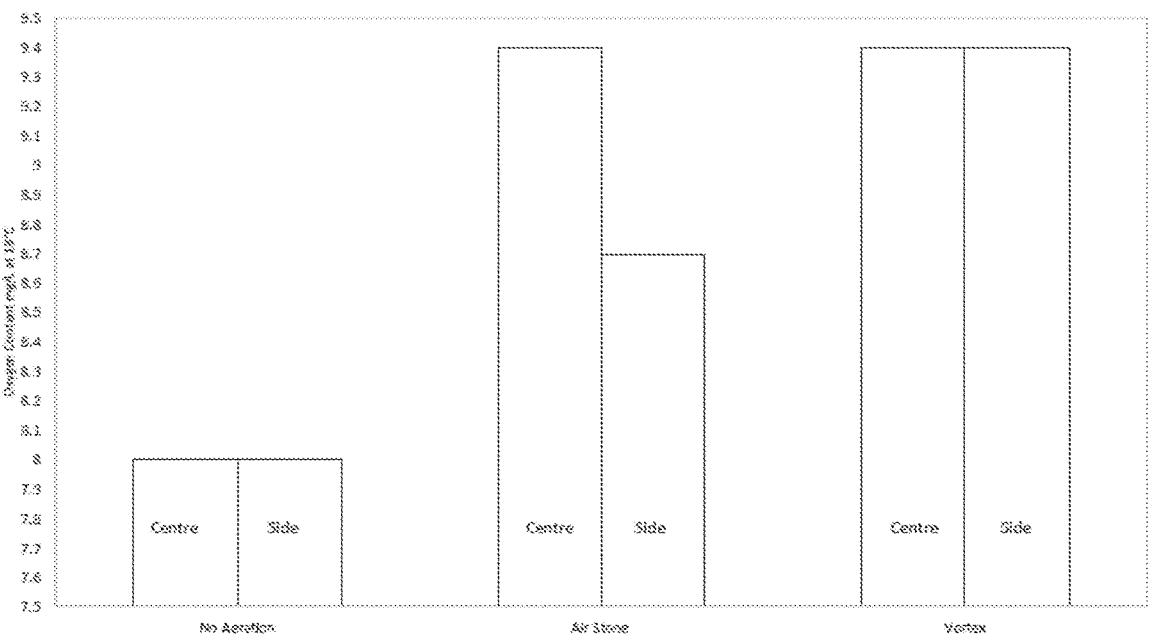
FIG. 4 shows the results of an experimental investigation into oxygen content achieved with an embodiment of the invention compared to no aeration and conventional aeration using a known air stone.

The data collected is summarised in the following table and shown in FIG. 4:

| DATA COLLECTED @ 160 ft above sea level | | | |
|---|---|---|---|
| CONTAINER VOLUME OF WATER | 35 L | | |
| DIAMETER | 550 MM | | |
| | LPM OF AIR SUPPLIED | FLOW LPM | WATER PRESSURE PSI |
| AIR STONE | 7 | N/A | N/A |
| VORTEX | 7 | 7.5 | 6.75 |
| OXYGEN CONTENT PPM INSTRUMENT LOCATION | No Aeration | Air Stone | Vortex |
| Centre | 8 | 9.4 | 9.4 |
| Side | 8 | 8.7 | 9.4 |

| Maximum Dissolved Oxygen Concentration Saturation Table | | | |
|---|---|---|---|
| Temperature (degrees ° C.) | DO (mg/L) | Temperature (degrees ° C.) | DO (mg/L) |
| 0 | 14.6 | 23 | 8.56 |
| 1 | 14.19 | 24 | 8.4 |

-continued

| Maximum Dissolved Oxygen Concentration Saturation Table | | | |
|---|---|---|---|
| Temperature (degrees ° C.) | DO (mg/L) | Temperature (degrees ° C.) | DO (mg/L) |
| 2 | 13.81 | 25 | 8.24 |
| 3 | 13.44 | 26 | 8.09 |
| 4 | 13.09 | 27 | 7.95 |
| 5 | 12.75 | 28 | 7.81 |
| 6 | 12.43 | 29 | 7.67 |
| 7 | 12.12 | 30 | 7.54 |
| 8 | 11.83 | 31 | 7.41 |
| 9 | 11.55 | 32 | 7.28 |
| 10 | 11.27 | 33 | 7.16 |
| 11 | 11.01 | 34 | 7.05 |
| 12 | 10.76 | 35 | 6.93 |
| 13 | 10.52 | 36 | 6.82 |
| 14 | 10.29 | 37 | 6.71 |
| 15 | 10.07 | 38 | 6.61 |
| 16 | 9.85 | 39 | 6.51 |
| 17 | 9.65 | 40 | 6.41 |
| 18 | 9.45 | 41 | 6.31 |
| 19 | 9.26 | 42 | 6.22 |
| 20 | 9.07 | 43 | 6.13 |
| 21 | 8.9 | 44 | 6.04 |
| 22 | 8.72 | 45 | 5.95 |

The above described embodiments have been given by way of example only, and the skilled reader will naturally appreciate that many variations could be made thereto without departing from the scope of the invention.

The invention claimed is:

1. A kit for recirculating deep water culture (RDWC) of plants, wherein the kit comprises a pot for use in growing plants which comprises a base, an annular wall extending from the base to a rim, a drain being defined in the base, an injector in the wall for injecting fluid into the pot, wherein the injector is located in the wall proximate to the base and distant to the rim and aligned with a plane tangential to the wall, the injector comprising a venturi and an air inlet, the kit further comprising a header pot mounted on an elbow incorporating mounting features which form a stand.

2. The kit according to claim 1, wherein the air inlet comprises an airline and an air filter.

3. The kit according to claim 1, wherein the air inlet comprises an air intake silencer.

4. The kit according to claim 3, wherein the air intake silencer is located in the air line between the venturi and the air filter.

5. The kit according to claim 1, wherein the venturi comprises a 19.05 mm inlet and outlet.

6. The kit according to claim 1, wherein the pot has a capacity of about 55 L to about 60 L.

7. The kit according to claim 1, wherein at least one clip mounting slot is provided on the rim of the pot.

8. The kit according to claim 1, wherein an indicator of fluid level is provided on an inner facing surface and/or an outer facing surface of the wall.

9. The kit according to claim 1, wherein the drain of the pot is provided with a 12.7 cm coupling.

10. The kit according to claim 1, wherein an injector mounting point is provided in the wall proximate to the base and distal to the rim.

11. The kit according to claim 10, wherein the injector comprises a conduit which extends through the injector mounting point parallel with the plane tangential to the wall of the pot.

12. The kit according to claim 11, wherein the conduit defines an opening through which fluid is injected into the pot, wherein the opening is located a tangential distance of about 250 mm to about 300 mm from an inner wall of the pot.

13. The kit according to claim 12, wherein, in use, fluid is injected into the pot through the injector conduit and the opening so that a maximum flow is achieved at a distance of about 50 mm to about 80 mm normal to the inner wall of the pot.

14. The kit according to claim 11, wherein the conduit has a shallow upward tilt.

15. The kit according to claim 1, wherein the wall of the pot is tapered towards the base.

16. The kit according to claim 1, wherein the drain is defined by an aperture in the base substantially in a center of the base.

17. The kit according to claim 1, wherein a removable lid is provided, which corresponds with the rim of the pot.

18. The kit according to claim 17, wherein the lid defines an opening which is circular.

19. The kit according to claim 17, wherein a propeller pattern is provided on a surface of the lid.

20. The kit according to claim 17, wherein the lid comprises a removable access hatch.

21. The kit according to claim 20, wherein a recess in the removable access hatch is provided.

22. The kit according to claim 17, wherein the lid defines a cut out.

23. The kit according to claim 1, wherein a net pot is provided which is capable of being enclosed by the pot.

24. The kit of claim 1, wherein the stand is sized and configured for seating a plurality of pots and wherein the stand provides secure mounting for the base of each pot.

25. The kit of claim 24, wherein the stand is arranged to allow a maximum amount of fluid to be drained from each pot when each pot is emptied.

26. The kit of claim 24, wherein the stand defines a cut out for a conduit to the injector.

27. The kit of claim 1, wherein a mounting for the base of each pot includes a location projection or indent which corresponds with a location indent or projection on each pot.

28. The kit of claim 27, wherein the stand is arranged to allow a maximum amount of fluid to be drained from each pot when each pot is emptied.

29. The kit of claim 1, further comprising a dual flow tee having a first channel for connection to the drain of each pot.

30. The kit according to claim 1, further comprising a pump, which, in use, pressurises fluid from the header pot and pumps it through the injectors into the pots.

31. The kit according to claim 30, wherein the pump is located externally to the header pot.

32. The kit according to claim 31, further comprising pipework for carrying fluid between the header pot and the pump and between the pump and the injectors.

33. The kit according to claim 32, wherein the pipework comprises push fit connections.

* * * * *